United States Patent [19]

Winquist

[11] 4,343,692

[45] Aug. 10, 1982

[54] CATALYTIC DEWAXING PROCESS

[75] Inventor: Bruce H. C. Winquist, Houston, Tex.

[73] Assignee: Shell Oil Company, Houston, Tex.

[21] Appl. No.: 248,653

[22] Filed: Mar. 27, 1981

[51] Int. Cl.$^3$ ............................................. C10G 48/18
[52] U.S. Cl. ..................................... 208/111; 208/18; 423/329
[58] Field of Search ................................. 208/111, 18

[56] References Cited

U.S. PATENT DOCUMENTS

| | | | |
|---|---|---|---|
| 3,539,498 | 10/1970 | Morris et al. | 208/111 |
| 3,620,963 | 11/1971 | Mulaskey | 208/111 |
| 3,933,974 | 1/1976 | Winquist | 423/118 |
| 3,966,883 | 6/1976 | Vaughn et al. | 423/329 |
| 3,970,544 | 7/1976 | Rosinski et al. | 208/111 |
| 3,980,550 | 9/1976 | Gorring et al. | 208/111 |
| 4,000,248 | 12/1976 | Martin | 423/329 |
| 4,017,590 | 4/1977 | Cormier et al. | 423/329 |
| 4,229,282 | 10/1980 | Peters et al. | 208/111 |
| 4,251,499 | 2/1981 | Nanne et al. | 423/329 |
| 4,259,174 | 3/1981 | Chen et al. | 208/111 |

*Primary Examiner*—Delbert E. Gantz
*Assistant Examiner*—G. E. Schmitkons
*Attorney, Agent, or Firm*—Dean F. Vance

[57] ABSTRACT

An improved process for catalytically hydrodewaxing a petroleum feedstock selected from a petroleum distillate or residual fraction, by contact of the feedstock and hydrogen with a catalyst is disclosed where the catalyst is a synthetic ferrierite zeolite having incorporated therewith at least one metal selected from the group consisting of Group VI B, Group VII B and Group VIII metals.

9 Claims, No Drawings

CATALYTIC DEWAXING PROCESS

BACKGROUND OF THE INVENTION

1. Field of the Invention

This invention relates to the catalytic hydrodewaxing of a petroleum feedstock. More particularly, the invention relates to the catalytic hydrodewaxing of a petroleum distillate with a particular zeolitic catalyst.

2. Description of the Prior Art

To be suitable for use as a lubricant, hydrocarbon oils are generally required to be sufficiently high boiling to have low volatility and a high flash point. The oils are required to flow freely, and thus generally must have a pour point below about 25° F. Normal paraffins and waxes present in virtually all high-boiling fractions of crude petroleum impart a high pour point to the oil fractions as obtained directly by distillation, and accordingly the oils must be treated to meet the low pour point specifications.

Catalytic dewaxing is a process for decreasing the pour point of lube oils by selectively hydrocracking the wax components to $C_1$ to $C_4$ range products, which can be separated readily from the oil. Since the waxes are destroyed in the process, its application is limited to schemes where conventional solvent dewaxing is not feasible or where a sufficient market does not exist to justify recovering the wax.

There are several areas where catalytic dewaxing might be applied. High viscosity index (HVI) lube oil production could be debottle-necked by adding a catalytic dewaxing reactor downstream from existing solvent dewaxing facilities. In this configuration a smaller fraction of the wax would be removed by solvent crystallation than is presently practiced, permitting higher charge rates. The pour point of the oil product then would be lowered to the required level by a catalytic dewaxing step.

The outlet for MVI and LVI (medium and low viscosity index) oils could be expanded, e.g., for refrigerator oils, by incorporation of catalytic dewaxing during oil processing. The pour point of hydrotreated LVI oils could be lowered, so that they could be sold for special low temperature applications such as for transformers and other electrical equipment. A further potential application is in dehazing of oils for certain low pour point applications where small residual amounts of wax produce an objectionable haze in the product.

A number of different catalysts have been proposed for catalytic dewaxing. In U.S. Pat. Nos. 3,348,887 and 3,539,498 a palladium on mordenite catalyst is employed. In U.S. Pat. No. 3,620,963, the catalyst employed is a mixture of mordenite and an amorphous porous inorganic oxide associated with nickel and tin. Recently, various ZSM-5 type catalysts have been proposed for hydrodewaxing. Processes using ZSM-5 catalysts are disclosed, for example, in U.S. Pat. Nos. 3,956,102; 3,968,024 and 3,980,550.

It has now been discovered that a particular zeolitic catalyst produces unexpected results in catalytic hydrodewaxing.

SUMMARY OF THE INVENTON

The present invention involves an improved process for catalytically hydrodewaxing a petroleum feedstock by contact of said feedstock and hydrogen with a catalyst. The catalyst employed herein is a synthetic ferrierite zeolite having incorporated therewith at least one metal selected from the group consisting of Group VI B, Group VII B and Group VIII metals. As shown in the following Illustrative Embodiments, catalytic hydrodewaxing using the presently claimed synthetic ferrierite catalyst results in the reduction of pour point in the oil *without* significantly affecting the viscosity index ($VI_e$) of the oil. By way of contrast, catalysts based on mordenite and ZSM-5 type zeolites do show significant declines in viscosity index. This unexpected property advantage for the synthetic ferrierite-based catalyst process is quite important from a commercial viewpoint since reduction of the viscosity index may make an oil unacceptable for the intended application.

Also of interest, it has been shown experimentally that palladium on natural ferrierite is not satisfactory in view of the rapid loss of catalyst activity. Accordingly, it is important that the catalyst be based on a synthetic ferrierite as opposed to a natural ferrierite.

DETAILED DESCRIPTION OF THE INVENTION

The catalyst employed in the dewaxing process comprises a hydrogenating metal component supported on a synthetic ferrierite zeolite. Synthetic ferrierite is usually prepared as the alkali metal aluminosilicate. To convert the synthetic ferrierite to a form active for the hydrocracking of the waxy components of the oil, it is converted to the hydrogen form by the removal of the alkali metal ion, usually potassium or sodium. The removal of the alkali metal ion is accomplished by contacting the synthetic ferrierite with ammonia or a compound thereof usually in the form of a water solution to incorporate the ammonium ion in the ferrierite. Subsequent calcination converts the ferrierite to the active or acid (H+) form. The ferrierite may also be converted to the acid form by contact with a dilute acid such as 3 N or 6 N HCl.

The synthetic ferrierite itself may be prepared by a variety of processes. These include, for example, the process described in U.S. pat. Nos. 3,966,883, 4,000,248 and 4,017,590. A particularly useful process for preparing synthetic ferrierite is described in U.S. Pat. No. 3,933,974, which disclosure is herein incorporated by reference. Other processes are described in U.S. Pat. No. 4,251,499, and Kibby et al., "Composition and Catalytic Properties of Synthetic Ferrierite", Journal of Catalysis, 35, pages 256-272 (1974).

The prominent structural features of synthetic ferrierite have been found by X-ray crystal structure determination to be parallel channels in the alumino-silicate framework. These channels, which are roughly elliptical in cross section, are of two sizes: larger channels having major and minor axes of about 5.5 and about 4.3 A respectively, and smaller parallel channels having major and minor axes of about 4.8 and about 3.4 A, respectively. Generally speaking ferrierite absorbs molecules small enough to penetrate the channels of its porous structure, such as, e.g., lower normal paraffin hydrocarbons such as methane, ethane, and in its hydrogen form larger molecules such as propane, n-hexane, n-octane and higher mol weight normal paraffins. Both alkali metal and hydrogen forms reject branched chain and cyclic hydrocarbon molecules.

The molar ratio of $SiO_2$ to $Al_2O_3$ in the synthetic ferrierite as synthesized is typically between about 10:1 and about 15:1. Preferably molar ratios are greater than 10:1. In a much preferred embodiment, the ferrierite is dealuminumized by standard procedures so the molar ratio of $SiO_2$ to $Al_2O_3$ is greater than about 80:1. In general, the greater the $SiO_2$ to $Al_2O_3$ ratio, the higher the activity.

Supported on the hydrogen form of the synthetic ferrierite is a metal (or compound thereof) selected from the group consisting of Groups VI B, Group VII B and Group VIII metals. A preferred group of metals include Pt, Pd, Mo, W, Co and Ni, with Pt and Pd being most preferred. The amount of metal incorporated therein ranges from about 0.01 to about 10.0 percent by weight, based on the total catalyst weight, preferably between about 0.10 and about 3.0 percent by weight. Combinations of metals may also be employed. The metal may be incorporated into the ferrierite by ion exchange or by impregnation, each by these methods being well known in the art.

Following incorporation of the ferrierite with the metal, the composite is dried by heating and then calcined at an elevated temperature of about 350° C. to about 650° C.

The catalytic dewaxing conditions are dependent in large measure on the feed used and upon the desired pour point. Generally, the temperature will be between about 150° C. and about 500° C., preferably between about 200° C. and about 425° C. The pressure is typically between about 500 psig and about 3,000 psig, preferably between about 1,000 psig and 2,000 psig. The liquid hourly space velocity (LHSV) preferably will be from 0.1 to 10, preferably between about 1.0 and about 5.0.

Hydrogen must be present in the reaction zone during the catalytic dewaxing process. The hydrogen to feed ratios is typically between about 2,000 and about 15,000 SCF/bbl (standard cubic feet per barrel), preferably about 6,000 to about 12,000 SCF/bbl. Generally, hydrogen will be separated from the product and recycled to the reaction zone.

The petroleum feeds which can be catalytically dewaxed by the present process include distillates and residual fractions. Preferably, the distillate to be treated herein have a boiling point above about 200° C., preferably between about 200° C. and about 800° C., more preferably between about 230° C. and about 550° C.

The petroleum distillate contemplated herein generally contains in the range of about 0.1 to about 50 percent by weight of waxy hydrocarbons. "Waxy hydrocarbons" mean any normally solid paraffinic hydrocarbon.

The catalyst may be in the form of granules, e.g., 10–25 mesh Tyler Standard Screen Scale, and preferably is in the form of an extrudate. The reaction is suitably carried out over a fixed bed of catalyst with the hydrogen and feedstock passing downwardly through the catalyst bed.

The invention is further illustrated by reference to the following Illustrative Embodiments, which are given for the purpose of illustration and comparison only, and are not meant to limit the invention to the particular reactants and conditions employed therein.

ILLUSTRATIVE EMBODIMENT I

In Illustrative Embodiment I, an HVI 250 waxy raffinate was hydrodewaxed with a 0.16% w Pd/H-ferrierite. The catalyst was prepared in several steps, starting with pure synthetic ferrierite. The starting ferrierite—synthetic Na, K-ferrierite—was prepared according to the procedure of U.S. Pat. No. 3,933,974, which disclosure is herein incorporated by reference. The hydrogen form of the zeolite was obtained by refluxing the synthetic Na,K-ferrierite for 1 hour with 10 ml/g of 2 M HCl, which had been saturated with NaCl at room temperature. It was refluxed twice for 1 hour with 10 ml/g of 1 M $(NH_4)_2SO_4$ solution, dried at 120° C., and calcined at 500° C. for 3 hours. It was then refluxed twice more with 1 M $(NH_4)_2SO_4$ solution and dried. Palladium was incorporated on the zeolite by refluxing for 90–120 hours with a two-fold excess of $Pd(NH_3)_4Cl_2$ in 2 M $NH_4NO_3$ solution at a pH of 9, obtained by addition of dilute ammonia. It was dried at 120° C., pressed and sieved into 12–20 mesh particles and calcined in stages: 1 hour at 200° C., 1 hour at 350° C. and 2 hours at 500° C. The catalyst was reduced in the microreactor in flowing $H_2$ at 400° C./750° F. for 3 hours at atmospheric pressure prior to introduction of the feed.

The catalytic tests were carried out in a conventional microreactor, using once-through hydrogen. The liquid from the product separator was stripped of light hydrocarbons by bubbling $N_2$ through the sample at 200° F., which resulted in an oil with a flash point above 400° F. Typically, 1–2% w of the sample was removed during stripping; most of the light products remained in the gas phase in the product separator, which was at room temperature.

The feed was a mid-continent HVI 250 waxy raffinate (pour point 110° F.), which represents a severe test of the selectivity of the catalyst. Typically, solvent dewaxing results in a pour point of ca. 15° F. by removal of about 27% of the raffinate as wax and oil occluded in the wax cake. The object was to determine if the catalyst could substantially lower the pour point of the feed without converting a significant portion of the oil.

Several initial balance periods were conducted at 1.0 LHSV (liquid hourly space velocity), 850 psig, and 8000 SCF/bbl $H_2$. The pressure then was increased to 1550 psig, which resulted in a significant improvement in activity (Table 1). The pour point of the oil was lowered from 110° F. to 40° F. with an oil yield of 86–89% w. The lowest pour point attained with the waxy feed was 40° F. at 600° F. and 1550 psig, which was not decreased further by operation at higher temperatures.

No aromatics saturation or desulfurization of the feed occurred. The nitrogen analyses indicated a small amount of nitrogen removal.

A rough measure of the n-paraffin contents of the feed and product was obtained by a simplified mol sieve sorption method, the results of which are shown in Table 1. The extensive reduction of the pour point of the oil, combined with the relatively high oil yield, indicates that the predominant reaction as hydrocracking of n-paraffins.

Hydrogen uptake data are included in Table 1. The hydrogen content of the liquid (oil) product was essentially unchanged by the dewaxing process, so the only significant uptake of hydrogen is in the formation of the light gas product. The uptake of hydrogen depends upon the level of conversion and the light gas product distribution, and increases with increasing reaction temperature, as the yield of $C_3^-$ product increases. Thus, at 640° F. the hydrogen uptake would be about 500 SCF/bbl, compared with 360 SCF/bbl at 600° F., as shown in the table.

TABLE 1

CATALYTIC DEWAXING OF MID-CONTINENT HVI 250 RAFFINATE WITH Pd/H—FERRIERITE

Feed: Mid-Continent HVI 250 waxy raffinate
Catalyst: 2442-53, 0.16% w Pd/H—Ferrierite
Conditions: 1.0 LHSV, 8000 SCF/bbl $H_2$/oil

| Period | Feed | 2 | 3 | 4 | 6 | 8 |
|---|---|---|---|---|---|---|
| Catalyst Age, hours | — | 12 | 18 | 23 | 33 | 43 |
| Pressure, psig | — | 850 | 850 | 850 | 1550 | 1550 |
| Temperature, °F. | — | 620 | 640 | 660 | 600 | 640 |
| Temperature, °C. | — | 327 | 338 | 349 | 316 | 338 |
| Oil Yield, % w | 100 | 88.1 | 87.6 | 85.9 | 88.9 | 86.7 |
| Pour Point, °F. | 110 | 55 | 40 | 40 | 40 | 45 |
| Aromatics, mmole/100g | 36 | — | — | 40 | — | 41 |
| N, ppm | 22 | — | — | 13 | 13 | 13 |
| S, ppm | 673 | — | — | — | 887 | — |
| n-Paraffins, % w[a] | 26.3 | — | 7.2 | — | — | — |
| Hydrogen Uptake, SCF/bbl | — | — | — | — | 360 | — |

[a] Measured by sorption of n-paraffins on Linde 5A mol sieve.

ILLUSTRATIVE EMBODIMENT II

The next feed examined was a partially dewaxed HVI 250 raffinate, which was chosen to determine the potential of the ferrierite-based catalysts for debottlenecking a solvent dewaxing process. The pour point of the partially dewaxed feed was lowered about 5°–10° F. by the Pd/ferrierite catalyst (same catalyst as Illustrative Embodiment I), as shown in Table 2. The n-paraffin content data indicate that substantial amounts of n-paraffins (15% w) remained in the oil after partial dewaxing. The wax crystallizing at the lower temperatures is not as readily hydrocracked by the ferrierite catalyst. This wax possibly contains some slightly branched paraffins, which behave like n-paraffins in the analytical procedure, but which are not converted by the catalyst.

No change in the viscosity index (VI) of the oils occurred upon processing over the ferrierite catalyst. The VI of the HVI 250 oil product was 92, which is within the range 88–92 normally encountered.

TABLE 2

CATALYTIC DEWAXING OF PARTIALLY DEWAXED HVI-250 WITH Pd/H—FERRIERITE

Feed: Partially dewaxed HVI 250 raffinate
Catalyst: 2442-88, 0.44% w Pd/H—Ferrierite
Conditions: 1550 psig, 8000 SCF/bbl $H_2$/oil

| Period | Feed | 4 | 5 | 6 | 8 | 9 | 12 |
|---|---|---|---|---|---|---|---|
| Catalyst Age, hours | — | 75 | 99 | 107 | 152 | 176 | 230 |
| LHSV | — | 1.0 | 1.0 | 1.0 | 1.0 | 1.0 | 0.75 |
| Temperature, °F. | — | 600 | 620 | 640 | 680 | 700 | 620 |
| Temperature, °C. | — | 316 | 327 | 338 | 360 | 371 | 327 |
| Oil Yield, % w | 100 | 98.0 | 95.8 | 96.3 | 95.4 | 95.2 | 96.3 |
| Pour Point, °F. | 40 | 35 | 30 | 30 | 30 | 30 | 35 |
| VI | 88–92 | — | — | 92 | — | — | — |
| n-Paraffins, % w[a] | 15.2 | — | 12.3 | — | — | — | — |
| Hydrogen Uptake, SCF/bbl | — | — | — | 290 | — | — | — |

[a] Measured by sorption of n-paraffins on Linde 5A mol sieve.

TABLE 3

CATALYTIC DEWAXING PRODUCT DISTRIBUTION

Feed: Partially dewaxed HVI 250 raffinate
Catalyst: 2442-88, 0.44% w Pd/H—Ferrierite
Conditions: 1.0 LHSV, 1550 psig, 8000 SCF/bbl $H_2$/oil

| Period | | 3 | 4 | 6 | 8 |
|---|---|---|---|---|---|
| | | | Temperature, °F. | | |
| Component | Feed | 560 | 600 | 640 | 680 |
| $C_1$ | — | 0.21 | 0.23 | 0.50 | 0.74 |
| $C_2$ | — | 0.47 | 0.53 | 1.19 | 1.74 |
| $C_3$ | — | 0.92 | 0.89 | 1.58 | 1.68 |
| i-$C_4$ | — | 0.0 | 0.10 | 0.14 | 0.08 |
| n-$C_4$ | — | 0.30 | 0.25 | 0.29 | 0.23 |
| $C_7H_{16}$ | — | 0.0 | 0.0 | 0.0 | 0.13 |
| Oil Yield, % w (Flash Point = 400° F.) | 100.0 | 98.1 | 98.0 | 96.3 | 95.4 |
| Oil Pour Point, °F. | 40 | 35 | 35 | 30 | 30 |

The distribution of the light products from dewaxing the partially dewaxed HVI 250 feed is shown in Table 3. Ethane and propane predominate and the fraction of the product in the $C_1$–$C_2$ range increases with increasing reaction temperature. The predominace of the $C_1$–$C_3$ products and the low iso/normal ratio of the $C_4$ product are unusual for acidic hydrocracking over zeolites. These results suggest that extensive secondary cracking occurs within the zeolite channels. Restricted diffusion of the heavier hydrocracked products ($C_4^+$) out of the zeolite channels increases the probability that they will be hydrocracked further to the lighter products ($C_3^-$), which can more readily diffuse out of the channel system. Restricted diffusion of branched-chain products would also result in the observed light product distribution.

ILLUSTRATIVE EMBODIMENT III

Two LVI feeds were examined in Illustrative Embodiment III. The first, a hydrotreated Mid-Continent LVI 750 distillate is representative of the general family of LVI and MVI oils which could find wider applications, e.g., for refrigerator and electrical oils, if the pour point could be sufficiently decreased. The small quantity of wax from this family of oils makes conventional solvent dewaxing difficult, expensive and often impractical.

The results of hydrocracking the LVI 750 feed are shown in Table 4. The catalyst was a 0.48% w Pd/H-ferrierite prepared in a similar manner to the catalyst of Illustrative Embodiment I. A pour point reduction of 20°–25° F. was achieved with 98% oil recovery during the first 100 hours of operation. The activity appears to have declined thereafter. The LVI feed has a much higher content of sulfur, which may have gradually poisoned the hydrogenation/dehydrogenation activity of the palladium. Incorporation of a sulfur-resistant hydrogenation/dehydrogenation function may result in greater stability.

No significant change in the VI of the oil was observed; the product VI was 62, which is only slightly lower than the normal range of 65–70.

A second LVI feed, hydrotreated LVI 750 distillate, was examined to determine the effect of a ferrierite-based catalyst on the cloud (haze) point of the oil (Table 5). A short run, using a 0.32% w Pd/H-ferrierite catalyst, was conducted at 650° F., 1550 psig and 8000 SCF/bbl $H_2$/oil.

The catalyst employed with the LVI 750 distillate was based on a Na,K-ferrierite prepared according to U.S. Pat. No. 3,933,974. Ninety grams of Na,K-ferrierite was refluxed for 1 hour with 900 ml of 2 M HCl solution which had been previously saturated with NaCl. The zeolite was recovered by filtration, washed with deionized water to remove residual acid, and refluxed twice more with 900 ml 1 M $(NH_4)_2SO_4$ for 1 hour. The zeolite was recovered, dried at 120° C. overnight, and calcined at 500° C. for 3 hours. The ammonium form was obtained by refluxing the zeolite twice for 1 hour with 900 ml of 1 M $(NH_4)_2SO_4$. It was then dried at 120° C. The zeolite after calcination at 500° C. had the following properties.

| | |
|---|---|
| Na, % w | 0.0022 |
| K, % w | 0.051 |
| Surface Area, $m^2/g$ | 339 |
| n-Hexane Sorption, % w | 3.69[a] |

[a]H. A. Benesi, Journal of Catalysis 38, 307–311 (1975).

Thirty four grams of the above zeolite was refluxed for 120 hours with 340 ml of solution containing 0.453 g $Pd(NH_3)_4Cl_2$ (80% excess), 2 M $NH_4NO_3$, and sufficient 15% aqueous $NH_3$ to obtain a pH of 8–9. The catalyst was recovered by filtration, washed with deionized $H_2O$, and dried at 120° C. It was then pressed into a cake at 20,000 psig, crushed, and sieved to 12–20 mesh. The finished catalyst was obtained by calcination at 250° C. for 1 hour, 375° C. for 1 hour, and 500° C. for 2 hours. The palladium content of the catalyst was 0.32% w.

The above catalyst was then employed with the LVI 750 feed. The conversion was determined at 1.0 and 3.0 LHSV. During a two day run at 1.0 LHSV the pour point of the oil was lowered from 30° F. to 0°–5° F. and the cloud point was lowered from 25° F. to 0°–5° F. Increasing the space velocity to 3.0 raised the cloud point of the product to 10° F.; the pour point was not affected. The yield of stripped oil averaged ca. 98.5% w. Since these runs were for screening purposes only, the experiment was terminated after 67 hours.

TABLE 4

DEWAXING OF LVI 750 DISTILLATE WITH Pt/FERRIERITE

Feed: Hydrotreated LVI 750 distillate
Catalyst: 2442-81, 0.48% w Pd/H—Ferrierite
Conditions: 1.0 LHSV, 1550 psig, 8000 SCF/bbl $H_2$/oil

| Period | Feed | 3 | 4 | 6 | 9 | 11 |
|---|---|---|---|---|---|---|
| Catalyst Age, hours | — | 73 | 94 | 142 | 194 | 222 |
| Temperature, °F. | — | 660 | 600 | 560 | 700 | 780 |
| Temperature, °C. | — | 349 | 316 | 293 | 371 | 416 |
| Oil Yield, % w | 100 | 98.7 | 97.4 | 98.6 | 97.2 | 95.6 |
| Pour Point, °F. | 25 | 0 | 5 | 15 | 15 | 15 |
| VI | (65–70) | — | — | — | 62 | — |
| Aromatics, mmole/100g | 98 | — | — | 100 | — | — |
| N, ppm | 265 | 275 | — | — | — | — |
| S, ppm | 1650 | 1600 | — | — | — | — |

TABLE 5

DEWAXING OF LVI 750 DISTILLATE WITH Pd/FERRIERITE

Feed: LVi-750 distillate, hydrotreated at 650° F., 0.67 LHSV, 2250 psig
Catalyst: 2442-65, 0.32% w Pd/H—Ferrierite
Conditions: 650° F., 1550 psig, 8000 SCF/bbl $H_2$/oil

| Period | Feed | 1 | 2 | 3 |
|---|---|---|---|---|
| LHSV | — | 1.0 | 1.0 | 3.0 |
| Catalyst Age, hours | — | 22 | 46 | 67 |
| Component, % w | | | | |
| $C_1$ | — | 0.18 | 0.09 | 0.34 |
| $C_2$ | — | 0.39 | 0.19 | 0.79 |
| $C_3$ | — | 0.58 | 0.03 | 1.17 |
| $C_4$ | — | 0.38 | 0.08 | 0.31 |
| $C_5$ | — | 0.08 | — | — |
| Oil Yield, % w | 100 | 98.4 | 99.6 | 97.4 |
| Pour Point, °F. | 30 | 0 | 5 | 5 |
| Cloud Point, °F. | 25 | 0 | 5 | 10 |

ILLUSTRATIVE EMBODIMENT IV

In Illustrative Embodiment IV, a variety of catalysts were employed with a particular feed stock. In all the experiments, the following equipment, feedstock, procedures and analyses were employed:

Equipment

The experiments were carried out in micro-scale units, using once-through trickle-flow operation. The reactor had an ID of 10 mm provided with a thermowell of 5 mm OD. The reactor was loaded with 8 ml catalyst (crushed to 30–80 mesh) diluted with 5 ml of 0.2 mm silicon carbide granules. This non-porous and chemically inactive diluent was added to the bed to improve the contacting between oil and catalyst and to minimize back-mixing of the fluid. The catalyst bed length was about 210 mm.

Feedstock

A 5% w blend of high melting point wax (prepared from Iranian Light bright stock slack wax) in "ONDINA" 33 medicinal oil was used as feedstock. The relevant properties are given in Table 6.

Test Procedure

The catalyst was gradually heated to 400° C. under a hydrogen flow of 16 Nl/h (normal liters per hour) at a pressure of 100 bara. After a hold step of 1 hour the temperature was reduced to 275° C. The feed was cut in at a WHSV of 1.5 kg.$l^{-1}.h^{-1}$ and the hydrogen flow adjusted to 2000 Nl/kg (~10,400 SCF/bbl) feed. After a stabilization period of 50 hours liquid product was collected over the next 24 hours. For every new condition a stabilization period of 24 hours was adopted.

Product Analyses

Liquid reaction products were topped by batch distillation (1-m Vigreux column of 25 mm diameter). The fraction boiling below 400° C. was removed partly at atmospheric pressure and partly at reduced pressure ($1.3 \times 10^3$ Pa; reflux ratio 3:1). After topping, the base oils were dewaxed at −20° C. The viscosities of the dewaxed oil were determined at 40°, 60° and 100° C.; the viscosity indices were calculated according to ASTM D 2270-75. The vent gas was analyzed by off-line GLC.

TABLE 6

| FEED | | |
|---|---|---|
| Tops < 400° C., | % w | 14.6 |
| Wax, | % w | 5.6 |
| Dewaxed oil, | % w | 79.8 |
| Dewaxed oil properties | | |
| $V_K$, 40° C., | $mm^2/s$ | 76.4 |
| $V_K$, 100° C. | $mm^2/s$ | 8.7 |
| $VI_E$ | | 81 |

Four different catalysts were employed in this series of experiments. One catalyst was a 1% w Pt on H+mordenite, similar to the catalyst employed in U.S. Pat. No. 3,539,498. Another was a 1% w Pd on H+ZSM-5. The other two catalysts were 1% Pt on H+ferrierite according to the present invention. In one case the ferrierite had the normal $SiO_2$ to $Al_2O_3$ molar ratio of 15:1. In the other case, the $SiO_2$ to $Al_2O_3$ ratio was increased by dealuminumization to a value of 100:1. The results are presented in Tables 7, 8, 9 and 10.

TABLE 7

CATALYST: 1 Pt/100 H+ Mordenite
CLA 20723

| Reactor temperature, | °C. | 225 | 250 | 275 |
|---|---|---|---|---|
| Tops < 400° C. | % w | 20.3 | 31.5 | 53.1 |
| Wax, | % w | 4.8 | 0.5 | 0.0 |
| Dewaxed oil, | % w | 74.9 | 69.9 | 46.9 |
| Dewaxed oil properties | | | | |
| $V_K$, 40° C., | mm²/s | 99.9 | 137 | — |
| $V_K$, 100° C., | mm²/s | 9.8 | 11.2 | — |
| $VI_E$ | | 69 | 52 | — |

TABLE 8

CATALYST: 1 Pd/100+ ZSM-5
CLA 17245

| Reactor temperature, | °C. | 225 | 250 | 275 | 300 |
|---|---|---|---|---|---|
| Tops < 400° C., | % w | 17.7 | 17.5 | 15.9 | 16.8 |
| Wax, | % w | 3.0 | 0.3 | 0.0 | 0.0 |
| Dewaxed oil, | % w | 79.3 | 82.2 | 84.1 | 83.2 |
| Dewaxed oil properties | | | | | |
| $V_K$, 40° C., | mm²/s | 103 | 95.9 | — | 112 |
| $V_K$, 100° C., | mm²/s | 9.9 | 9.6 | — | 10.5 |
| $VI_E$ | | 66 | 70 | — | 68 |

TABLE 9

CATALYST: 1 Pt/100 H+ Ferrierite
$SiO_2/Al_2O_3$ = 15 m/m
CLA 18104

| Reactor temperature, | °C. | 225 | 275 | 300 | 325 |
|---|---|---|---|---|---|
| Tops < 400° C., | % w | 15.0 | 16.9 | 22.4 | 35.6 |
| Wax, | % w | 4.8 | 3.4 | 3.5 | 1.6 |
| Dewaxed oil, | % w | 80.2 | 79.7 | 74.1 | 62.9 |
| Dewaxed oil properties | | | | | |
| $V_K$, 40° C., | mm²/s | 88.6 | — | 89.5 | 77.1 |
| $V_K$, 100° C. | mm²/s | 9.6 | — | 9.6 | 8.7 |
| $VI_E$ | | 82 | — | 82 | 79 |

TABLE 10

CATALYST: 1 Pt/100 H+ Ferrierite
$SiO_2/Al_2O_3$ = 100 m/m
CLA 18105

| Reactor temperature, | °C. | 225 | 275 | 300 |
|---|---|---|---|---|
| Tops < 400° C., | % w | 17.8 | 15.8 | 17.6 |
| Wax, | % w | 5.2 | 1.3 | 0.3 |
| Dewaxed oil, | % w | 77.0 | 82.9 | 82.1 |
| Dewaxed oil properties | | | | |
| $V_K$, 40° C., | mm²/s | — | 87.1 | 89.9 |
| $V_K$, 100° C. | mm²/s | — | 9.3 | 9.4 |
| $VI_E$ | | — | 78 | 75 |

Of various wide-pore (6.5–7.5×10⁻¹⁰ m) zeolites tested, the Pt/mordenite was the best. At 250° C., 90% of the wax was converted at an oil yield decline of 10%. However, this catalyst is unattractive due to the isomerization of the oil components as indicated by the dramatic drop in VI from 81 for the dewaxed oil of the feed to 52 after processing over mordenite at 250° C.

Medium-pore zeolites include both the ZSM-5 and ferrierite zeolites. At 250° C., the Pd/ZSM-5 catalyst converted the wax without appreciable tops production. However, isomerization and/or alkylation reactions of the oil components took place although to a lesser extent than with mordenite. Still a drop of 10 points in VI was observed.

The structure of ferrierite is very similar to the one of ZSM (except that it has eight-ring interconnecting channels instead of ten-ring as in ZSM) but the free aperture of the main, straight channel is smaller (4.3×5.5 versus 6.0×10⁻¹⁰m). A higher temperature (above 325° C.) is required to convert the wax with the unavoidable effect of an oil yield loss. It is remarkable that the viscometric properties changes so little (n.b. isomerization reactions seem to be absent). Upon dealuminating the zeolite from its normal $SiO_2$ to $Al_2O_3$ molar ratio of 15 to a value of 100, the catalytic activity increased considerably: at 300° C. practically all the wax was converted. Ferrierite with the high $SiO_2/Al_2O_3$ ratio had a catalytic activity high enough to convert the wax without the excessive production of tops. Although it requires a higher temperature than ZSM-5 for the same wax conversion it has one great advantage over ZSM: less isomerization of the oil components occurs. The loss in VI is therefore reduced to only 3–6 points (respectively at 75 and 95% wax conversion).

What is claimed is:

1. In the process for catalytically hydrodewaxing a pretroleum feedstock selected from the group consisting of distillates and residual fractions by contact of said feedstock and hydrogen with a catalyst, the improvement wherein said catalyst is a synthetic ferrierite zeolite having incorporated therewith at least one metal selected from the group consisting of Group VI B, Group VII B and Group VIII metals.

2. The process according to claim 1 wherein said metal is selected from the group consisting of Pt, Pd, Mo, W, Co and Ni.

3. The process according to claim 1 wherein said metal is selected from the group consisting of Pt and Pd.

4. The process according to claim 1 or claim 3 wherein said synthetic ferrierite has a $SiO_2$ to $Al_2O_3$ molar ratio of greater than about 10:1.

5. The process according to claim 4 wherein said $SiO_2$ to $Al_2O_3$ molar ratio is greater than about 80:1.

6. The process according to claim 1 or claim 3 wherein the amount of metal incorporated with the synthetic ferrierite is about 0.01 to about 10.0 percent by weight based on the total weight of metal plus ferrierite.

7. The process according to claim 1 wherein the hydrodewaxing conditions comprise a hydrogen pressure of about 500 to about 3,000 psig, a temperature of about 200° to about 425° C., and a space velocity of about 0.10 to about 10.0 LHSV.

8. The process according to claim 1 wherein the boiling range of the petroleum feedstock is between about 200° C. and about 800° C.

9. The process according to claim 8 wherein said petroleum feedstock is a petroleum distillate having a boiling range of between about 200° C. and about 550° C.

* * * * *